US009762461B2

United States Patent
Raghunathan et al.

(10) Patent No.: US 9,762,461 B2
(45) Date of Patent: *Sep. 12, 2017

(54) CLOUD SERVICES PERFORMANCE TUNING AND BENCHMARKING

(71) Applicant: ORACLE INTERNATIONAL CORPORATION, Redwood Shores, CA (US)

(72) Inventors: Kavitha Raghunathan, Saratoga, CA (US); John Masterson, Navan (IE); Nick Balch, High Wycombe (GB); Clive Bostock, North Yorkshire (GB); Florin Popescu, Bucharest (RO); John Murphy, Rockport, TX (US); Emer Ferns, Dublin (IE); Mihai Alistar, Bucharest (RO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 264 days.

This patent is subject to a terminal disclaimer.

(21) Appl. No.: 13/937,483

(22) Filed: Jul. 9, 2013

(65) Prior Publication Data
US 2015/0019707 A1    Jan. 15, 2015

(51) Int. Cl.
*G06F 15/16*    (2006.01)
*H04L 12/26*    (2006.01)
*G06F 11/34*    (2006.01)

(52) U.S. Cl.
CPC ......... *H04L 43/06* (2013.01); *G06F 11/3428* (2013.01); *G06F 11/3495* (2013.01); *H04L 43/08* (2013.01); *G06F 2201/81* (2013.01)

(58) Field of Classification Search
None
See application file for complete search history.

(56) References Cited

U.S. PATENT DOCUMENTS 6,016,394 A    1/2000    Walker
6,185,625 B1    2/2001    Tso et al.
(Continued)

FOREIGN PATENT DOCUMENTS

CN    1652087 A    8/2005
CN    105308577    2/2016
(Continued)

OTHER PUBLICATIONS

Chanchary et al., Data Migration: Connecting Databases in the Cloud, ICCIT 2012, Saudi Arabia, retrieved from the Internet: <URL:http://www.chinacloud.cnjupload/2012-03/12033108076850.pdf>, Jun. 28, 2012, pp. 450-455.
(Continued)

*Primary Examiner* — Thomas Dailey
(74) *Attorney, Agent, or Firm* — Kilpatrick Townsend & Stockton LLP

(57) ABSTRACT

Embodiments of the invention provide systems and methods for providing services related to managing computer systems. More specifically, embodiments of the present invention provide for providing performance tuning and benchmarking services to remote computer systems. Generally speaking, the service can provide functions to help customers maintain a consistent performance of their databases with minimal downtime by pro-actively addressing issues or bottlenecks with periodic assessments, monitoring of performance metrics that are causing stress throughout the term of the service, reporting violations of agreed upon thresholds for performance, and reactively helping customers address performance issues that arise with reactive tuning.

20 Claims, 8 Drawing Sheets

(56) References Cited

U.S. PATENT DOCUMENTS

| | | |
|---|---|---|
| 6,477,483 B1 * | 11/2002 | Scarlat .............. G06F 11/3414 702/186 |
| 6,738,811 B1 | 5/2004 | Liang |
| 6,973,489 B1 | 12/2005 | Levy |
| 7,177,866 B2 | 2/2007 | Holenstein et al. |
| 7,290,003 B1 | 10/2007 | Tong |
| 7,548,898 B1 | 6/2009 | Tarenskeen et al. |
| 7,580,862 B1 | 8/2009 | Montelo et al. |
| 7,693,983 B1 | 4/2010 | Gupta et al. |
| 8,150,811 B1 | 4/2012 | Tarenskeen et al. |
| 8,271,757 B1 | 9/2012 | Chatterjee et al. |
| 8,606,894 B1 | 12/2013 | Fremont et al. |
| 8,639,989 B1 | 1/2014 | Sorenson, III et al. |
| 8,924,353 B1 | 12/2014 | Patwardhan et al. |
| 8,943,032 B1 | 1/2015 | Xu et al. |
| 9,098,364 B2 | 8/2015 | Davis |
| 9,442,983 B2 | 9/2016 | Higginson et al. |
| 9,491,072 B2 | 11/2016 | Raghunathan et al. |
| 2001/0029502 A1 | 10/2001 | Oeda |
| 2002/0002578 A1 | 1/2002 | Yamashita |
| 2002/0019826 A1 | 2/2002 | Tan |
| 2002/0147645 A1 | 10/2002 | Alao et al. |
| 2002/0194329 A1 * | 12/2002 | Alling .................. G06Q 10/06 709/224 |
| 2002/0198984 A1 | 12/2002 | Goldstein et al. |
| 2003/0066049 A1 | 4/2003 | Atwood et al. |
| 2003/0069903 A1 | 4/2003 | Gupta et al. |
| 2003/0192028 A1 | 10/2003 | Gusler et al. |
| 2004/0098425 A1 | 5/2004 | Wiss et al. |
| 2004/0167840 A1 | 8/2004 | Tully et al. |
| 2004/0178261 A1 | 9/2004 | Potonniee et al. |
| 2004/0181790 A1 * | 9/2004 | Herrick .................. G06F 8/60 717/168 |
| 2004/0260875 A1 | 12/2004 | Murotani et al. |
| 2005/0021567 A1 | 1/2005 | Holenstein et al. |
| 2005/0055446 A1 | 3/2005 | Chidambaran et al. |
| 2005/0102318 A1 | 5/2005 | Odhner et al. |
| 2005/0204241 A1 | 9/2005 | Tamakoshi |
| 2006/0059253 A1 | 3/2006 | Goodman et al. |
| 2006/0112247 A1 | 5/2006 | Ramany et al. |
| 2006/0156086 A1 | 7/2006 | Flynn et al. |
| 2006/0173875 A1 | 8/2006 | Stefaniak et al. |
| 2006/0179171 A1 | 8/2006 | Stefaniak et al. |
| 2006/0179431 A1 | 8/2006 | Devanathan et al. |
| 2006/0235899 A1 | 10/2006 | Tucker |
| 2006/0282825 A1 | 12/2006 | Taylor |
| 2007/0150488 A1 | 6/2007 | Barsness et al. |
| 2007/0239774 A1 | 10/2007 | Bodily et al. |
| 2007/0299892 A1 | 12/2007 | Nakahara |
| 2008/0247320 A1 | 10/2008 | Grah et al. |
| 2008/0313595 A1 | 12/2008 | Boulineau et al. |
| 2009/0070733 A1 | 3/2009 | Huang et al. |
| 2009/0113399 A1 | 4/2009 | Tzoref et al. |
| 2009/0187413 A1 | 7/2009 | Abels et al. |
| 2009/0210857 A1 | 8/2009 | Martineau |
| 2009/0238078 A1 | 9/2009 | Robinson et al. |
| 2009/0313311 A1 | 12/2009 | Hoffmann et al. |
| 2010/0005097 A1 * | 1/2010 | Liang .............. G06F 11/3414 707/E17.032 |
| 2010/0191884 A1 | 7/2010 | Holenstein et al. |
| 2010/0192156 A1 | 7/2010 | Hollingsworth |
| 2010/0198799 A1 | 8/2010 | Krishnan et al. |
| 2010/0262974 A1 | 10/2010 | Uyeda |
| 2011/0093436 A1 | 4/2011 | Zha et al. |
| 2011/0107327 A1 | 5/2011 | Barkie et al. |
| 2011/0161933 A1 | 6/2011 | Hudson |
| 2012/0017112 A1 * | 1/2012 | Broda .................. G06F 9/5083 714/4.4 |
| 2012/0041933 A1 | 2/2012 | Driesen |
| 2012/0150642 A1 | 6/2012 | Kandanala et al. |
| 2012/0221845 A1 | 8/2012 | Ferris |
| 2012/0254435 A1 | 10/2012 | Zhaofu et al. |
| 2012/0265726 A1 | 10/2012 | Padmanabhan et al. |
| 2012/0284360 A1 | 11/2012 | Bense et al. |
| 2012/0297016 A1 * | 11/2012 | Iyer .................. G06F 9/5072 709/217 |
| 2012/0303739 A1 | 11/2012 | Ferris |
| 2012/0311128 A1 * | 12/2012 | Pechanec .......... G06F 11/3414 709/224 |
| 2013/0067298 A1 * | 3/2013 | Li .................. G06F 11/3688 714/799 |
| 2013/0085742 A1 | 4/2013 | Barker et al. |
| 2013/0085989 A1 | 4/2013 | Nayyar et al. |
| 2013/0152050 A1 | 6/2013 | Chang et al. |
| 2013/0173546 A1 | 7/2013 | Cline et al. |
| 2013/0173547 A1 | 7/2013 | Cline et al. |
| 2013/0211559 A1 | 8/2013 | Lawson et al. |
| 2013/0268643 A1 | 10/2013 | Chang et al. |
| 2013/0268799 A1 | 10/2013 | Mestery et al. |
| 2013/0268800 A1 | 10/2013 | Rangaiah et al. |
| 2013/0283364 A1 | 10/2013 | Chang et al. |
| 2013/0297802 A1 | 11/2013 | Laribi et al. |
| 2013/0311968 A1 | 11/2013 | Shama |
| 2013/0326028 A1 | 12/2013 | Cox et al. |
| 2014/0007216 A1 | 1/2014 | Ahn |
| 2014/0019961 A1 | 1/2014 | Neuse et al. |
| 2014/0059559 A1 | 2/2014 | Alatorre et al. |
| 2014/0075033 A1 | 3/2014 | Doering et al. |
| 2014/0089809 A1 | 3/2014 | Levy et al. |
| 2014/0109053 A1 | 4/2014 | Vasudevan et al. |
| 2014/0172782 A1 | 6/2014 | Schuenzel et al. |
| 2014/0195636 A1 | 7/2014 | Karve et al. |
| 2014/0279890 A1 | 9/2014 | Srinivasan et al. |
| 2014/0337429 A1 | 11/2014 | Asenjo et al. |
| 2014/0344439 A1 | 11/2014 | Kempf et al. |
| 2015/0019195 A1 | 1/2015 | Davis |
| 2015/0019197 A1 | 1/2015 | Higginson et al. |
| 2015/0019478 A1 | 1/2015 | Buehne et al. |
| 2015/0019479 A1 | 1/2015 | Buehne et al. |
| 2015/0019487 A1 | 1/2015 | Buehne et al. |
| 2015/0019488 A1 | 1/2015 | Higginson et al. |
| 2015/0019564 A1 | 1/2015 | Higginson et al. |
| 2015/0019700 A1 | 1/2015 | Masterson et al. |
| 2015/0019706 A1 | 1/2015 | Raghunathan et al. |
| 2015/0020059 A1 | 1/2015 | Davis |
| 2016/0364229 A1 | 12/2016 | Higginson et al. |

FOREIGN PATENT DOCUMENTS

| | | |
|---|---|---|
| CN | 105324756 | 2/2016 |
| CN | 105324769 | 2/2016 |
| CN | 105359102 | 2/2016 |
| CN | 105359146 | 2/2016 |
| CN | 105359147 | 2/2016 |
| CN | 105393250 | 3/2016 |
| CN | 105556515 | 5/2016 |
| CN | 105580032 | 5/2016 |
| EP | 2418591 | 2/2012 |
| EP | 3019958 | 5/2016 |
| EP | 3019961 | 5/2016 |
| EP | 3019962 | 5/2016 |
| EP | 3019975 | 5/2016 |
| EP | 3019976 | 5/2016 |
| EP | 3019979 | 5/2016 |
| EP | 3019980 | 5/2016 |
| EP | 3019981 | 5/2016 |
| EP | 3020010 | 5/2016 |
| GB | 2468742 | 9/2010 |
| JP | 2006277153 | 10/2006 |
| WO | 9952047 | 10/1999 |
| WO | 0153949 | 7/2001 |
| WO | 2015/005991 | 1/2015 |
| WO | 2015/005994 | 1/2015 |
| WO | 2015/006124 | 1/2015 |
| WO | 2015/006129 | 1/2015 |
| WO | 2015/006132 | 1/2015 |
| WO | 2015/006137 | 1/2015 |
| WO | 2015/006138 | 1/2015 |

(56) References Cited

FOREIGN PATENT DOCUMENTS

| WO | 2015/006308 | 1/2015 |
|---|---|---|
| WO | 2015/006358 | 1/2015 |

OTHER PUBLICATIONS

Leite et al., Migratool: Towards a Web-Based Spatial Database Migration Tool, IEEE Computer Society, Proceedings of the 16th International Workshop on Database and Expert Systems Applications, Aug. 22, 2005, pp. 480-484.
Tao et al., Intelligent database placement in cloud environment, Web Services (ICWS), 2012 IEEE 19th International Conference, IEEE Computer Society, Jun. 24, 2012, pp. 544-551.
U.S. Appl. No. 13/938,066, Non-Final Office Action mailed on Dec. 17, 2014.
International Application No. PCT/US2014/045226, International Search Report and Written Opinion mailed on Oct. 30, 2014, 10 pages.
International Application No. PCT/US2014/045240, International Search Report and Written Opinion mailed on Oct. 21, 2014, 10 pages.
International Application No. PCT/US2014/045289, International Search Report and Written Opinion mailed on Oct. 15, 2014, 9 pages.
International Application No. PCT/US2014/045721, International Search Report and Written Opinion mailed on Nov. 4, 2014, 12 pages.
International Application No. PCT/US2014/045804, International Search Report and Written Opinion mailed on Nov. 17, 2014, 12 pages.
U.S. Appl. No. 13/937,970, Non-Final Office Action mailed on May 5, 2015, 17 pages.
U.S. Appl. No. 13/937,977, Final Office Action mailed on Feb. 26, 2015, 30 pages.
U.S. Appl. No. 13/938,066, Notice of Allowance mailed on Apr. 29, 2015, 15 pages.
U.S. Appl. No. 13/937,977, Non-Final Office Action mailed on Aug. 12, 2014, 28 pages.
Charles, Bug Severity vs. Priority, Quality Intelligence Blog, Retrieved on Aug. 4, 2014, from http://quality-intelligence.blogspot.com/2010/08/bug-severity-vs-priority.html, Aug. 22, 2010, 6 pages.
Das et al., Albatross: Lightweight elasticity in shared storage databases for the cloud using five data migration, 37th International Conference on Very Large Data Bases, Proceedings of the VLDB Endowment, vol. 4, No. 8, Retrieved from the Internet:URL:http://www.cs.ucsb.eduj-sudiptojpapers/albatross.pdf, Aug. 29, 2011, 12 pages.
International Application No, PCT/US2014/040486, International Search Report and Written Opinion mailed on Sep. 29, 2014, 11 pages.
International Application No. PCT/US2014/040692, International Search Report and Written Opinion mailed on Oct. 8, 2014, 8 pages.
International Application No. PCT/US2014/045247, International Search Report and Written Opinion mailed on Sep. 3, 2014, 8 pages.
International Application No. PCT/US2014/045282, International Search Report and Written Opinion mailed on Sep. 18, 2014, 12 pages.
U.S. Appl. No. 13/937,344, Non-Final Office Action mailed on Sep. 24, 2015, 11 pages.
U.S. Appl. No. 13/937,977, Non-Final Office Action mailed on Aug. 19, 2015, 34 pages.
U.S. Appl. No. 13/938,066, Corrected Notice of Allowability mailed on Jun. 2, 2015, 2 pages.
International Application No. PCT/US2014/040486, Written Opinion mailed on Jun. 17, 2015, 7 pages.
International Application No. PCT/US2014/040692, Written Opinion mailed on Jul. 16, 2015, 7 pages.
U.S. Appl. No. 13/937,868, Non-Final Office Action mailed on Nov. 4, 2015, 18 pages.
U.S. Appl. No. 13/937,545, Non-Final Office Action mailed on Nov. 10, 2015, 19 pages.
U.S. Appl. No. 13/937,344, Final Office Action mailed on Feb. 11, 2016, all pages.
U.S. Appl. No. 13/937,970, Final Office Action mailed on Dec. 10, 2015, all pages.
U.S. Appl. No. 13/937,486, Non-Final Office Action mailed on Jan. 11, 2016, all pages.
International Preliminary Report on Patentability of PCT/US2014/045247, mailed on Jan. 21, 2016, all pages.
International Preliminary Report on Patentability of PCT/US2014/045804, mailed on Jan. 21, 2016, all pages.
International Preliminary Report on Patentability of PCT/US2014/045721, mailed on Jan. 21, 2016, all pages.
International Preliminary Report on Patentability of PCT/US2014/045282, mailed on Jan. 21, 2016, all pages.
International Preliminary Report on Patentability of PCT/US2014/045289, mailed on Jan. 21, 2016, all pages.
International Preliminary Report on Patentability of PCT/US2014/045240, mailed on Jan. 21, 2016, all pages.
Notification of Transmittal of The International Preliminary Report on Patentability of PCT/US2014/040486, mailed on Oct. 1, 2015, all pages.
Notification of Transmittal of The International Preliminary Report on Patentability of PCT/US2014/040692, mailed on Oct. 8, 2015, all pages.
International Preliminary Report on Patentability of PCT/US2014/045226, mailed on Jan. 21, 2016, all pages.
Baysal et al., A bug you like: A framework for automated assignment of bugs, Program Comprehension, 2009. ICPC '09. IEEE 7th International Conference, May 17-19, 2009, pp. 297-298.
U.S. Appl. No. 13/937,344, Notice of Allowance mailed on May 4, 2016, 11 pages.
U.S. Appl. No. 13/937,344, Notice of Allowance mailed on Jun. 6, 2016, 5 pages.
U.S. Appl. No. 13/937,545, Final Office Action mailed on May 13, 2016, 20 pages.
U.S. Appl. No. 13/937,868, Final Office Action mailed on Apr. 22, 2016, 23 pages.
U.S. Appl. No. 13/937,970, Non-Final Office Action maiied on May 12, 2016, 28 pages.
U.S. Appl. No. 13/937,977, Notice of Allowance mailed on Mar. 16, 2016, 18 pages.
To et al., Best Practices for Database Consolidation on Exadata Database Machine, Oracle, Oracle White Paper, 2011, 35 pages.
Vengurlekar et al., Best Practices for Database Consolidation in Private Clouds, Oracle, Oracle White Paper,, Mar. 2012, 29 pages.
U.S. Appl. No. 13/937,344, Corrected Notice of Allowability mailed on Sep. 15, 2016, 2 pages.
U.S. Appl. No. 13/937,486, Final Office Action mailed on Jul. 23, 2016, 18 pages.
U.S. Appl. No. 13/937,885, Non-Final Office Action mailed on Aug. 18, 2016, 32 pages.
U.S. Appl. No. 13/937,977, Corrected Notice of Allowability mailed on Jul. 18, 2016, 2 pages.
U.S. Appl. No. 13/937,988, Non-Final Office Action mailed on Sep. 1, 2016, 10 pages.
U.S. Appl. No. 13/938,061, Non-Final Office Action mailed on Aug. 18, 2016, 29 pages.
U.S. Appl. No. 13/937,344, Notice of Allowance mailed on Oct. 11, 2016, 2 pages.
U.S. Appl. No. 13/937,486, Non-Final Office Action mailed on Nov. 4, 2016, 20 pages.
U.S. Appl. No. 13/937,970, Final Office Action mailed on Dec. 1, 2016, 22 pages.
U.S. Appl. No. 13/937,545, Non-Final Office Action dated Feb. 7, 2017, 19 pages.
U.S. Appl. No. 13/938,061, Final Office Action dated Mar. 23, 2017, 29 pages.
U.S. Appl. No. 13/937,868, Non-Final Office Action dated Apr. 5, 2017, 23 pages.

(56) References Cited

OTHER PUBLICATIONS

U.S. Appl. No. 13/937,970, Advisory Action dated Apr. 13, 2017, 3 pages.
U.S. Appl. No. 15/250,522, Notice of Publication dated Dec. 15, 2016, all pages.
Chinese Application No. 201480035255.X, Office Action dated Feb. 27, 2017, 11 pages (5 pages for the original document and 6 pages for the English translation).
European Application No. 14745014.2, Office Action dated Jan. 18, 2017, 8 pages.

* cited by examiner

CLOUD SERVICES PERFORMANCE TUNING AND BENCHMARKING

CROSS-REFERENCES TO RELATED APPLICATIONS

The present application is related to the following co-pending and commonly assigned U.S. Patent Applications:

U.S. patent application Ser. No. 13/937,977, filed Jul. 9, 2013, and entitled "METHOD AND SYSTEM FOR REDUCING INSTABILITY WHEN UPGRADING SOFTWARE;"

U.S. patent application Ser. No. 13/938,061, filed Jul. 9, 2013, and entitled "CONSOLIDATION PLANNING SERVICES FOR SYSTEMS MIGRATION;"

U.S. patent application Ser. No. 13/938,066, filed Jul. 9, 2013, and entitled "MIGRATION SERVICES FOR SYSTEMS;"

U.S. patent application Ser. No. 13/937,885, filed Jul. 9, 2013, and entitled "DATABASE MODELING AND ANALYSIS;"

U.S. patent application Ser. No. 13/937,868, filed Jul. 9, 2013, and entitled "AUTOMATED DATABASE MIGRATION ARCHITECTURE;"

U.S. patent application Ser. No. 13/937,344, filed Jul. 9, 2013, and entitled "CLOUD SERVICES LOAD TESTING AND ANALYSIS;"

U.S. patent application Ser. No. 13/937,988, filed Jul. 9, 2013, and entitled "SOLUTION TO GENERATE A SCRIPTSET FOR AN AUTOMATED DATABASE MIGRATION;"

U.S. patent application Ser. No. 13/937,545, filed Jul. 9, 2013, and entitled "ONLINE DATABASE MIGRATION;"

U.S. patent application Ser. No. 13/937,486, filed Jul. 9, 2013, and entitled "DYNAMIC MIGRATION SCRIPT MANAGEMENT;" and U.S. patent application Ser. No. 13/937,970, filed Jul. 9, 2013, and entitled "ADVANCED CUSTOMER SUPPORT SERVICES—ADVANCED SUPPORT CLOUD PORTAL," of which the entire disclosure of each is incorporated herein by reference for all purposes.

BACKGROUND OF THE INVENTION

Embodiments of the present invention relate generally to methods and systems for providing services related to managing computer systems and more particularly to providing performance tuning and benchmarking services to remote computer systems.

Modern database systems are very complex, comprised of numerous components. Managing the systems, diagnosing problems, updating software, and installing new components may therefore be a very involved and complicated task. As a result, system administrator may spend considerable time determining problems, upgrading software, and installing new components. In many cases, specialists or specially trained technicians and administrators may be needed on site to perform the more complicated and specialized tasks.

The necessity to use specially trained technicians and administrators may increase costs and/or increase delays and uncertainty of maintaining and operating the systems. It may often take days or even weeks for a technician or administrator trained to be available to come to a specific site to upgrade software or diagnose a problem. The cost of travel, time, and time investment for the technician or administrator to understand the system and components before the work may begin may further add to the time delay and costs. Hence, there is a need for improved methods and systems for providing services related to managing computer systems.

BRIEF SUMMARY OF THE INVENTION

Embodiments of the invention provide systems and methods for providing performance tuning and benchmarking services to remote computer systems. According to one embodiment, providing performance tuning and benchmarking services to one or more remote computer systems can comprise initiating by a service provider computer system one or more performance tuning and benchmarking services. Initiating the one or more load testing services can comprises providing by the service provider system access to the one or more performance tuning and benchmarking services through the portal, receiving by the service provider system through the portal a customer selection of at least one of the one or more performance tuning and benchmarking services and an indication of the one or more remote computer system as targets of the selected at least one of the one or more performance tuning and benchmarking services, and installing by the service provider system the gateway on the one or more remote computer systems indicated as targets if the gateway is not yet installed on the one or more remote computer systems indicated as targets.

Providing performance tuning and benchmarking services to remote computer systems can further comprise capturing by the service provider system through a gateway data for a first set of metrics related to performance of the one or more remote computer systems for a first period of a defined term of the performance tuning and benchmarking services. Capturing the set of data related to performance of the one or more remote computers can comprise identifying by the service provider system the first set of metrics related to performance of the one or more remote computer systems based at least in part on an indication received through the portal and monitoring the identified first set of metrics for the first period. The service provider computer system can perform a performance review based on the captured data for the first set of metrics. Performing the performance review can comprise generating a baseline report for the first period, the baseline report comprising results of the performance review and a set of recommendation associated with the results. A first set of one or more reports, which may include the baseline report, based on results of performing the performance review on the captured data can be provided through the portal.

Providing performance tuning and benchmarking services to remote computer systems can further comprise identifying by the service provider system based at least in part on indications received through the portal a second set of metrics for continued monitoring and a threshold associated with each of the second set of metrics. The service provider system can capture through the gateway data for a second set of metrics related to performance of the one or more remote computer systems for a second period of the defined term of the performance tuning and benchmarking services. Capturing data for the second set of metrics can further comprise monitoring the captured data against the thresholds associated with the metrics. The service provider computer system can perform a performance review based on the captured data for the second set of metrics, generate one or more reports for the second period based on results of performing the performance review on the captured data, the reports for the second period comprising results of the performance review, indications of instances where the captured data exceeded the thresholds, and a set of recommendation associated with the results, and provide the reports through the portal. In some cases, providing performance tuning and benchmarking services to remote computer systems can further comprise repeating said identifying metrics for continued monitoring, capturing data for the identified metrics, performing a performance review based on the captured data, and providing reports based on results of performing the performance review on the captured data for a number of periods until an expiration of the term of the performance tuning and benchmarking services.

DETAILED DESCRIPTION OF THE INVENTION

Figure 1:
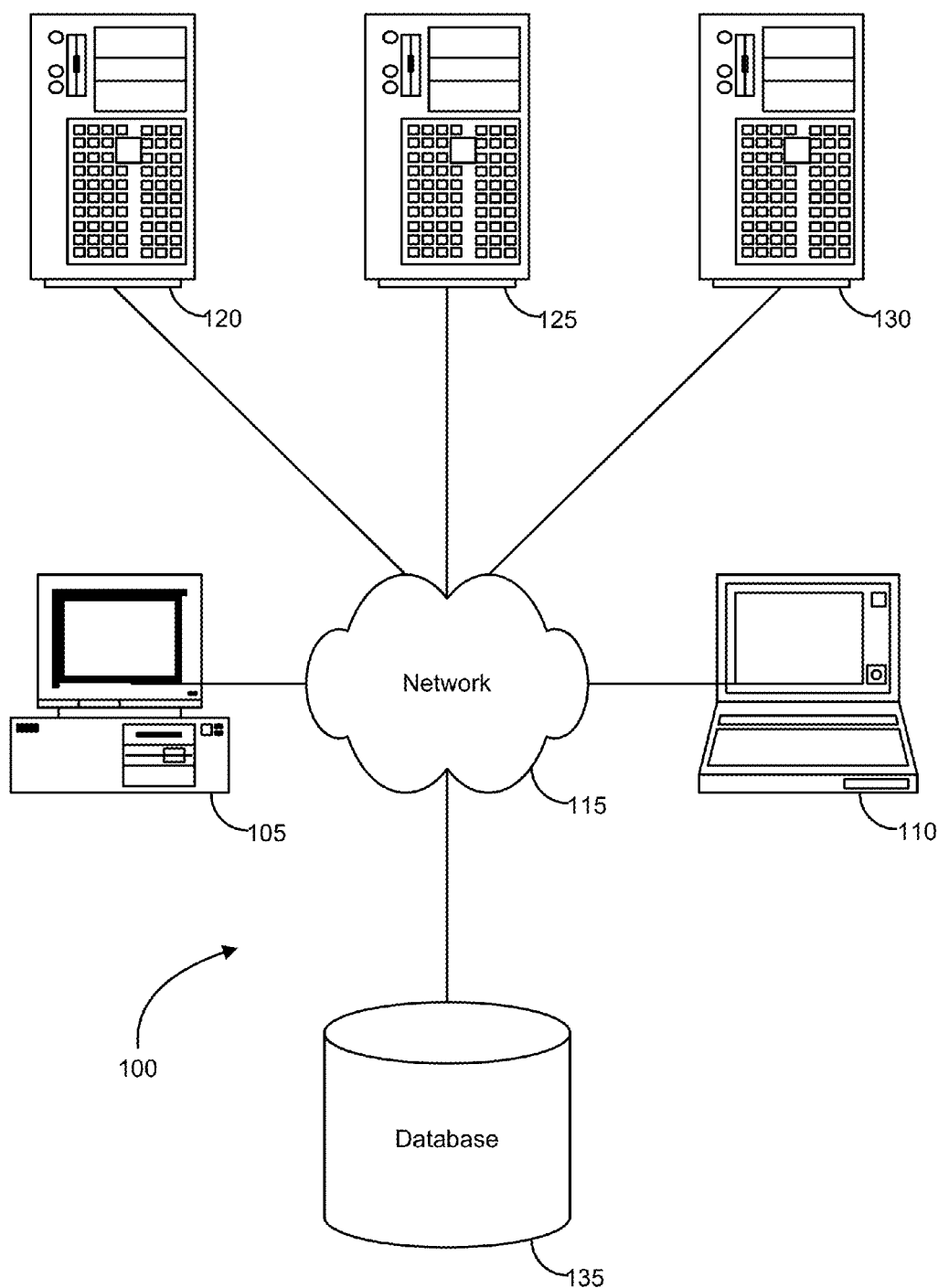
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for providing services related to managing computer systems. More specifically, embodiments of the present invention provide for providing performance tuning and benchmarking services to remote computer systems. Generally speaking, the service can provide functions to help customers maintain a consistent performance of their databases with minimal downtime by pro-actively addressing issues or bottlenecks with periodic assessments, monitoring of performance metrics that are causing stress throughout the term of the service, reporting violations of agreed upon thresholds for performance, and reactively helping customers address performance issues that arise with reactive tuning. More specifically, the service can conduct a performance assessment of the customer's database and produce an initial set of recommendations and reports. The service can also identify performance metrics or benchmark candidates that are causing stress and present results of the assessment and the benchmark candidates to the customer in the form of reports, e.g., on a daily metrics thresholds and violations of the performance metrics. These reports of findings, charts and graphs, and recommendations can be made available to the customer via the portal which may, in some cases, make available a web conference or otherwise provide communications with a subject matter expert to discuss the findings and recommendations. Tuning may be made available periodically to help with any performance issues that are associated with the metrics monitored. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
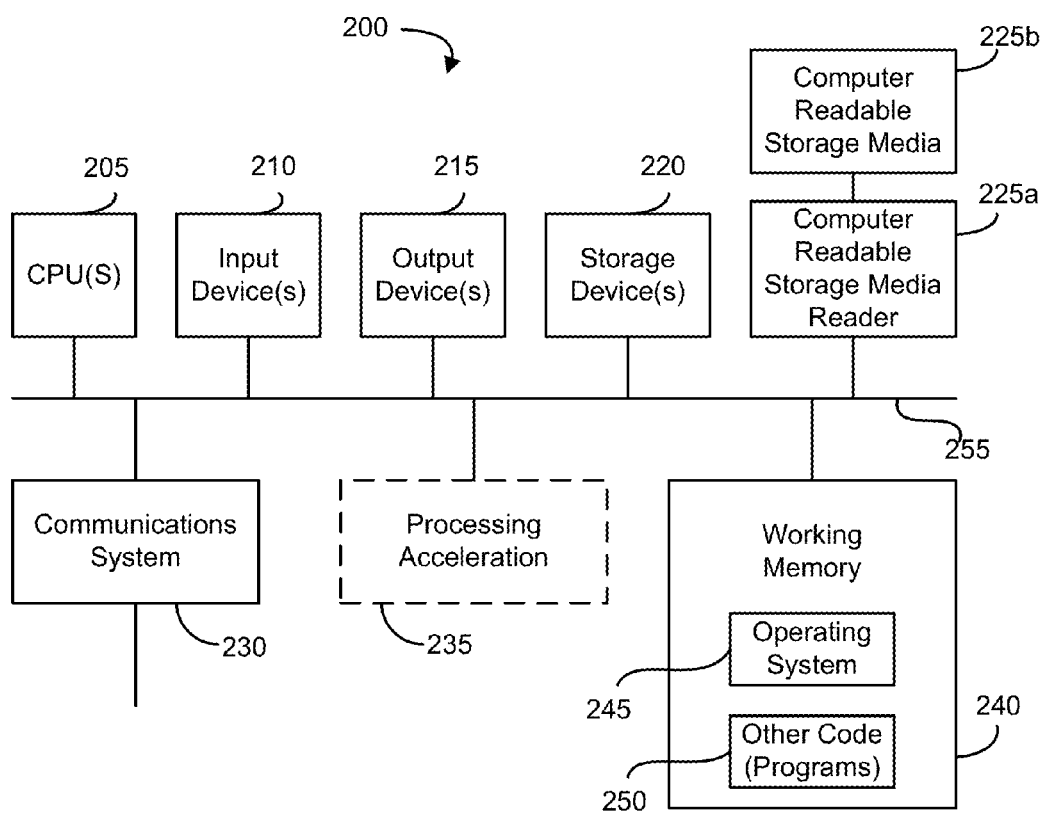
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

A database system, such as any of the systems described above, may require administration such as periodic maintenance, software upgrades, migration, service deployment, diagnostics, performance tuning, and/or other services. Some organizations and businesses that use database systems may employ system administrators or other personnel to perform some of these tasks. Some tasks may require special skills or knowledge outside the scope of a typical administrator and may require an outside expert or personnel to accomplish the tasks. In some cases, the administration tasks may be performed by an outside entity or engineer as a service to the organization or business.

Traditionally, services are provided based on multiple engagements with customer contacts, and creating a contract and service delivery plan tailored to the customer's needs. Service delivery itself is traditionally provided onsite and based on the specific knowledge and/or software the service engineer has access to and may differ from engineer to engineer.

Many of the administrative tasks and services associated with database systems may be simplified and streamlined with a platform architecture that supports remote administration, development, and deployment of services. A system may be configured to allow automation of tasks and services and the reuse of components. Such a system may be used to generate, store, deploy, execute, and track services through their complete life cycle. Services may be designed, made available for deployment, deployed to a customer, and monitored using the system.

According to one embodiment, such a system may include a remote portal from which customers, administrators, and service provider may monitor, deploy, and analyze services for a remote customer's target system. The administration may be performed and controlled remotely and at least in part automatically. Services may be controlled and deployed to the target system using the portal eliminating the need for an administrator to be local to the target system. Likewise, the portal can provide a rich set of tools for all customers and depends less on the individual skill and knowledge of the particular engineer performing service.

Such a system may facilitate performing services in at least a partially automated and remote manner and may result in a number of important benefits to the service provider and the customer. For example, the system may reduce the time to market for new services. A unified system which enables services to be built using common features/components may reduce the time to develop and test the new service. Automation and consistency may allow the service provider to create a standard pricing and contracting model that can be re-used for new services. Sales and contracting time for new services may be reduced due the simplified pricing model. A service provider may create a modular service portfolio and can deliver services discretely or as part of a solution. The system may reduce the cost of developing and delivering services by allowing service designers and developers to leverage common features. As developers create more automated services, this reduces/eliminates the need for manual input, thus reducing the cost of delivering a service. The system may also provide for an improvement in global service quality and consistency since services may be designed, developed and delivered through the platform in at least a partially automated manner. The system may also expand the market for services enabling services to be easily sold and delivered.

In embodiments, such a system may be used for the development and deployment of services including assessment services assessing infrastructure, business data, and/or transactions of the database system. The services may leverage analytics to identify key indicators, patterns and/or trends. Services may install, monitor and/or perform setup of new software and/or hardware. Services may install and implement gold images or perform migrations, upgrades, and consolidations. In addition services may include provisioning, cloning, backup and recovery, install, setup, test, monitoring, recovery and restore, metering, chargeback, testing, load testing, functional testing, performance management and tuning, and/or the like. In some embodiments, the services may leverage one service as a basis for other services.

Figure 3:
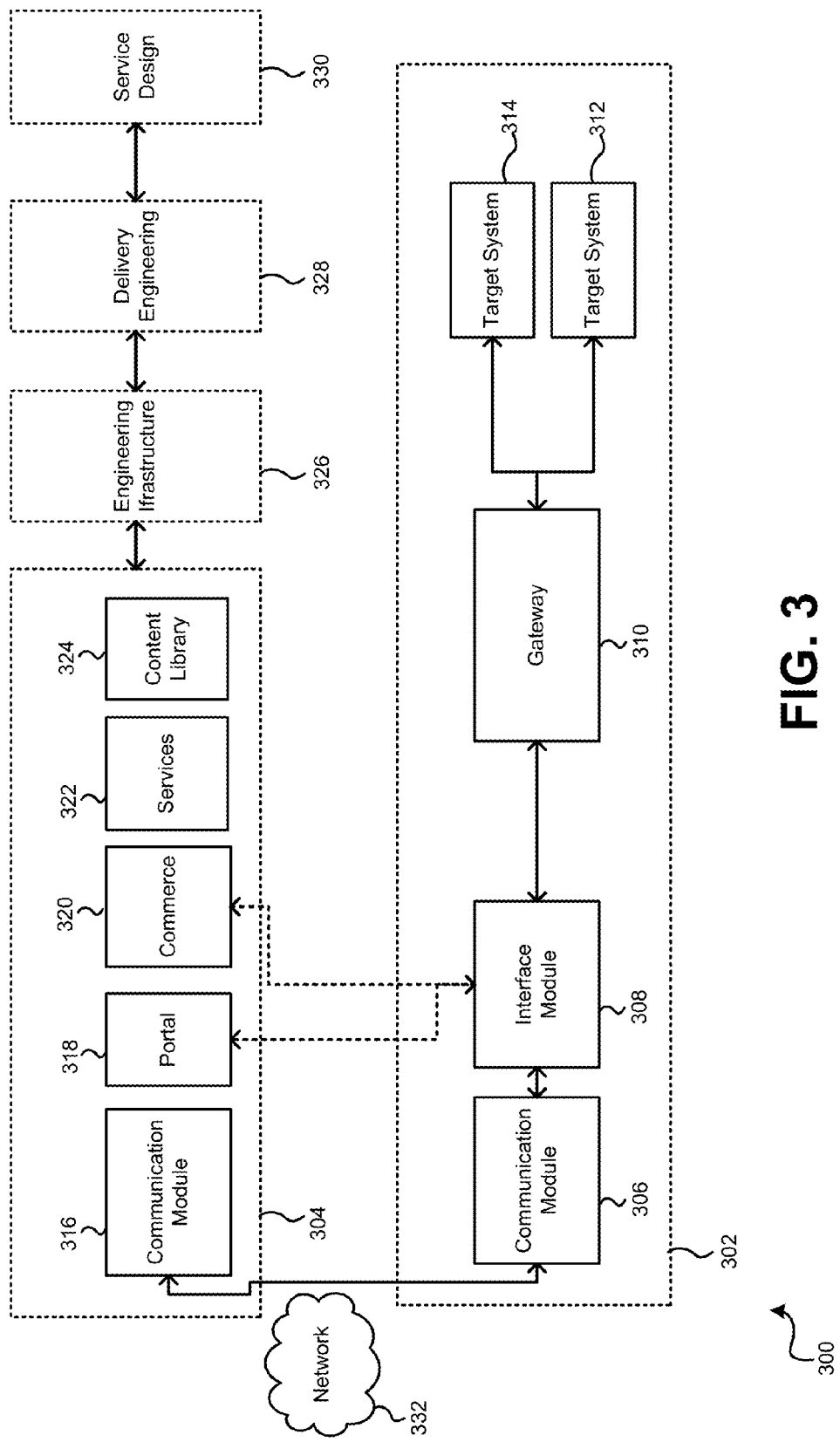
FIG. 3 is a block diagram illustrating, at a high-level, functional components of a system for delivering services according to one embodiment of the present invention.

FIG. 3 is a block diagram illustrating, at a high-level, functional components of a system for delivering services according to one embodiment of the present invention. Generally speaking, services may be designed, made available for deployment, deployed to a customer, and monitored using the system 300. The customer data center 302 may include one or more target systems 312, 314 that may be the target of the services provided by the system 300. The target systems may be servers, computers, rack systems, and the like that run or execute a database and/or other database software used by a customer. A target system may be a hardware or software entity that can have service delivered and may be a host, database, web logic service, and/or the like. In the customer data center 302, the target systems 312, 314 may be managed by an administrator local to the data center 302. The administrator may have physical access to the target systems 312, 314. The cloud system 300, may provide for the administration and other services of the target systems via a remote interface from a remote location. A gateway 310, located on the data center 302 provides remote access to the data center 302 and one or more target systems 312, 314. The gateway 310 may be a hardware or virtual software appliance installed at the customer data center. The gateway 310 connects to a production cloud 304 of a service provider via a secure connection using a communication module 306 over a network 332. The gateway 310 may optionally have an interface module 308 allowing control of the interactions of gateway 310 to the production cloud 304 of the service provider.

Services may be generated and developed using a common service development framework of the system 300. The common service development framework may include a service design 330, delivery engineering 328, and engineering infrastructure 326 modules. The common service development framework may leverage common components that can be used throughout the delivery process (manual and/or automated), and may enable the efficient design, development, testing and release of a service. The common service development framework of the system 300 enables at least partial automation of the development of a service.

The system 300 enables delivery engineers to automate the service they are developing. In some embodiments, the development of services may be automated or simplified with the use of reusable components. For example, many of the same deployment, execution, and error handling function used in the services may be designed as reusable components. The components may be reused in many services allowing the design and coding of the service to be focused on the new core functionality of the service. Using the system 300, services may be designed and implemented in one or more central locations. A centralized service design and development system 300 enables a hierarchical and structured service design with reusable components and modules. The development of a service may be, at least in part, automated since a large portion of the components of a service may assembled from existing reusable components.

After the services are designed, developed, and tested, they may be stored at the production cloud 304. The production cloud 304 may include a library of services 322 and a content library 324. The services and content may be deployed from the production cloud 304 to one or more target systems 312, 314 at a customer data center 302. The deployment, monitoring, and the like of services may be arranged with interaction from the portal 318 and commerce module 320 at the production cloud 304 and the gateway 310 and an interface module 308 at the customer data center 302 via the communication modules 306, 316. The design, deployment and monitoring of the service may be performed remotely from production cloud without the need of an administrator or engineer at the customer's data center 302. The portal 318 of the system 300 may provide for remote control and administration of services, control of deployment, and analysis of results.

The system 300 of FIG. 3 may be used to develop, deploy and manage, services for the customer data center 302 and target systems 312, 314. A gateway 310 has access to the target systems 312, 314. Services, in the forms of software, scripts, functions, and the like, may be downloaded from the production cloud 304. The commerce module 320 and the portal for the production cloud 304 provide an interface, selection tools, monitoring tools, for selecting the services, and monitoring the services to be deployed in the customer data center 302. An administrator at the customer data center 302 may view, select, and monitor the services using the portal 318 and commerce module 320. The customer may access the portal 318 and commerce module 320 using interface module 308 at the customer data center 302. The interface module may have a direct or an indirect access to the portal 318 and the commerce module via the communication module 306. For example, using the system 300, a service may be selected using the commerce module 320. The commerce module 320 may be accessed using the interface module 308. Once a service is selected and configured for the target systems 312, 314, the service may be deployed from the production cloud 304 to the customer data center 302 via the gateway 310. The gateway may deploy the service on to the target systems. The gateway 310 may be used to gather data statistics, monitor services, and receive system information about the customer data center and the target systems. The data may be processed, analyzed, and transmitted to the production cloud. The data may be used to suggest or deploy services to the customer, present statistics or metrics of the customer's target servers using the portal 318. Additional details of various elements of system 300 including the portal 318 and gateway 310 are described in the Related Applicants entitled "Advanced Customer Support Services—Advanced Support Cloud Portal" referenced above and incorporated herein.

As noted above, such a system 300 can facilitate performing services in at least a partially automated and remote manner. For example, a service provider can implement such a system to provide to a customer services including but not limited to performing periodic maintenance, providing software upgrades, performing system migrations, supporting service deployments, diagnostics, performance tuning, and/or other services. Some such services are described in greater detail in the Related Applications referenced above and incorporated herein. According to one embodiment, these services can additionally or alternatively include a performance tuning and benchmarking service. Generally speaking, the service can provide functions to help customers maintain a consistent performance of their databases with minimal downtime by pro-actively addressing issues or bottlenecks with periodic assessments, monitoring of performance metrics that are causing stress throughout the term of the service, reporting violations of agreed upon thresholds for performance, and reactively helping customers address performance issues that arise with reactive tuning. More specifically, the service can conduct a performance assessment of the customer's database and produce an initial set of recommendations and reports. The service can also identify performance metrics or benchmark candidates that are causing stress and present results of the assessment and the benchmark candidates to the customer in the form of reports, e.g., on a daily metrics thresholds and violations of the performance metrics. These reports of findings, charts and graphs, and recommendations can be made available to the customer via the portal which may, in some cases, make available a web conference or otherwise provide communications with a subject matter expert to discuss the findings and recommendations. Tuning may be made available periodically to help with any performance issues that are associated with the metrics monitored.

Figure 4:
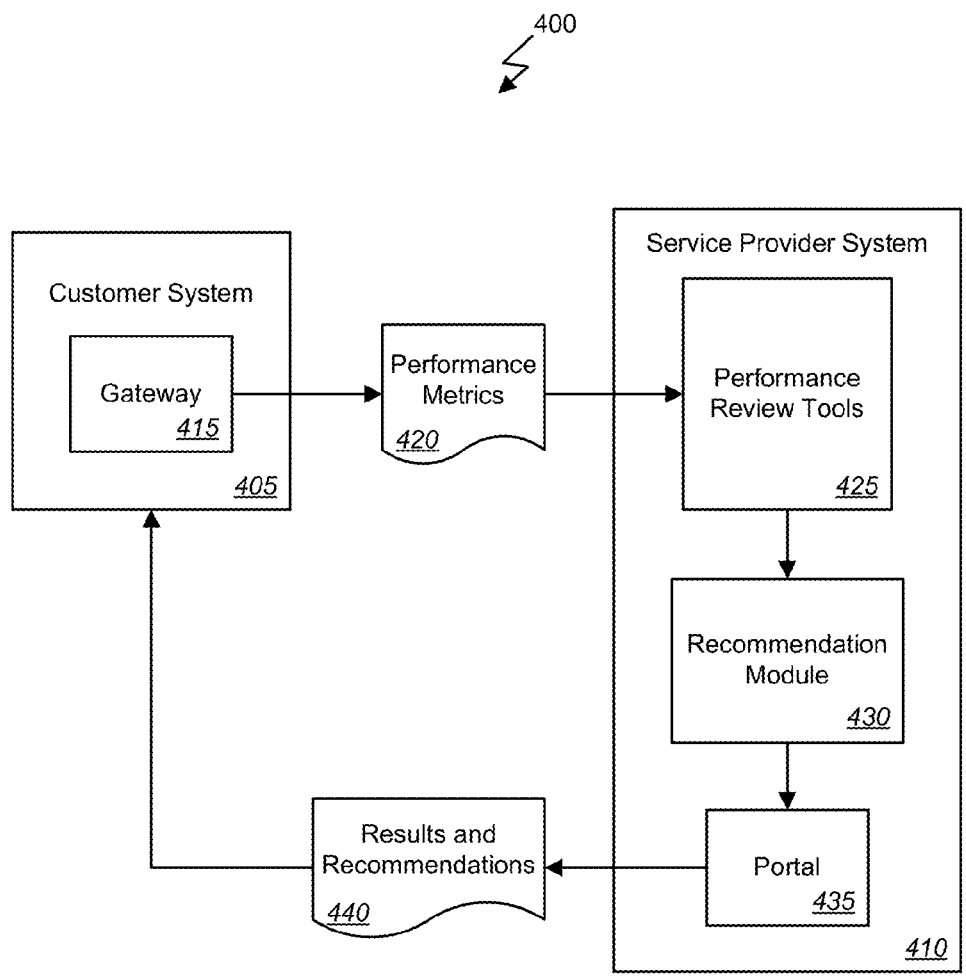
FIG. 4 is a block diagram illustrating, conceptually, a process for performing performance tuning and benchmarking according to one embodiment of the present invention.

FIG. 4 is a block diagram illustrating, conceptually, a process for performing performance tuning and benchmarking according to one embodiment of the present invention. In this example, the system 400 includes a customer system 405 and a service provider system 410. As discussed above, the service provider system 410 may execute a portal module. Generally speaking, the portal 435 can provide an interface (not shown here) such as a set of web pages through which an administrator, manager, or other user of the customer system 405 may interact with the service provider system 410, for example, to request the performance tuning and benchmarking and/or other services. Through this interface, the user of the customer system 405 can identify and/or define the system to be tested, tests to be performed, etc. In response, the service provider system 410 can initiate the gateway 415 or, if not yet installed on the customer system 405, the service provider system 410 may install and initiate the gateway 415 on the customer system 405.

Once initiated, the gateway 415 can collect a set of data or performance metrics 420 and provide these collected performance metrics to the service provider system 405. The service provider system 410 can execute a set of one or more performance review tools 425 which can analyze the collected performance metrics 420. A recommendation module 430 of the service provider system can be used to analyze the output of these tools 425 and can provide set of recommendations, for example based on or guided by input from one or more human analysts operating the service provider system 410. The recommendations can be provided to the portal 435 to then be made available to the user of the customer system 405, for example in the form of one or more web pages 440 or other interface. Examples, of such an interface will be described in greater detail below with reference to FIGS. 6 and 7.

In use, the performance tuning and benchmarking service may comprise an ongoing service to be delivered over a defined term, e.g., one year, with periodic, e.g., monthly, quarterly, etc., reviews. In such cases, an initial review of the customer system 405 by the service provider system 410 can be considered a baseline performance review. Upon completion of the baseline review by the service provider system 410, recommendations can be made through the interface 440 provided by the portal 435. In some cases, areas of stress and related recommendations for addressing these issues may be provided. For the given period review period, e.g., quarterly, those points/metrics can be monitored against thresholds agreed to by customer. For example, the CPU of the customer system 405 running at 99% may be considered too high. In such cases, recommended actions can include making changes to code or set-up, etc. of the customer system 405 and may include indications of an expected result, e.g., reduction of the CPU load to 95%. If the customer makes the indicated changes, the gateway 415 and service provider system 410 can monitor CPU load at that level and show CPU data with a that threshold through the interface of the portal 435.

At the next periodic (e.g., quarterly) check, performance of the customer system 405 against the baseline or the measured performance of the previous period can be checked for improvement by the service provider system 410. Charts can be made available through the interface of the portal 435 at any time but performance metric collection and evaluation and recommendation as described above can be done and made periodically (e.g., quarterly) through the term of the service (e.g., one year). It should be understood that, with each iteration, the periodic check might change the recommendations and the metrics monitored for the next period.

Figure 5:
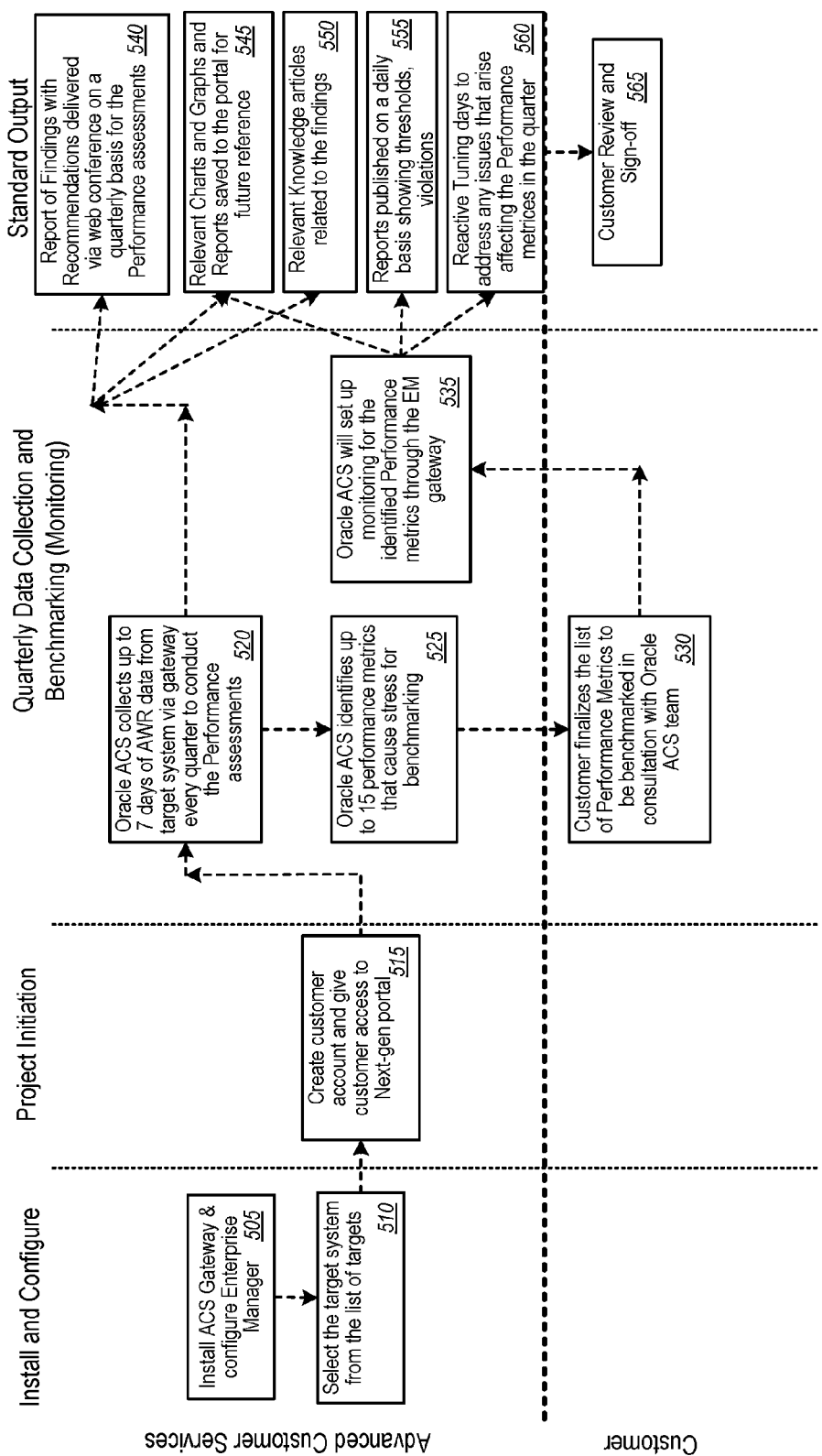
FIG. 5 is a flowchart illustrating a process for performing performance tuning and benchmarking according to one embodiment of the present invention.

FIG. 5 is a flowchart illustrating a process for performing performance tuning and benchmarking according to one embodiment of the present invention. As illustrated here, the process can begin with an install and configure phase in which the service provider can install and configure 505 (with customer approval) the gateway on the customer system. Once the gateway is installed 505, the target customer system can be identified 510 by the service provider system. The project can then be initiated 515 during which a customer account can be created and the customer can be given access to the portal of the service provider system.

Next, during a periodic data collection and benchmarking phase, the service provider system can collect 520 data from the customer system through the gateway for a period of time. Based on this collected data, the service provider system can identify 525 metrics that are candidates for benchmarking, i.e., that are a cause of stress or performance problems for the customer system. These metrics may be presented to the customer, e.g., though the portal interface, for approval 530 to be benchmarked for the next period. In response, service provider system can monitor 535 the identified 525 and approved 530 metrics through the gateway.

During an output phase, a variety of different reports and/or other information can be provided by the service provider system. For example, the service provider system may report 540 findings with associated recommendations to be delivered via a web conference through the portal and between a representative from the service provider and a representative of the customer. Additionally or alternatively, the service provider system may provide 545 charts and graphs of the monitored metrics through the portal. In some cases, the service provider system may additionally or alternatively provide 550 knowledge base articles and/or other materials related to reported metrics, recommendations, etc. In another example, the service provider system may also provide 555 reports showing agreed upon thresholds for the monitored metrics and any violations of those thresholds that may have occurred. Additionally or alternatively, the service provider system may support 560 periodic tuning of the customer system to address identified issues affecting the performance of the customer system. Again, this tuning may affect the monitored metrics and/or the threshold for those metrics. Any one or more of these and other reports may be provided through the portal for review 565 and approval by the customer.

Figure 6:
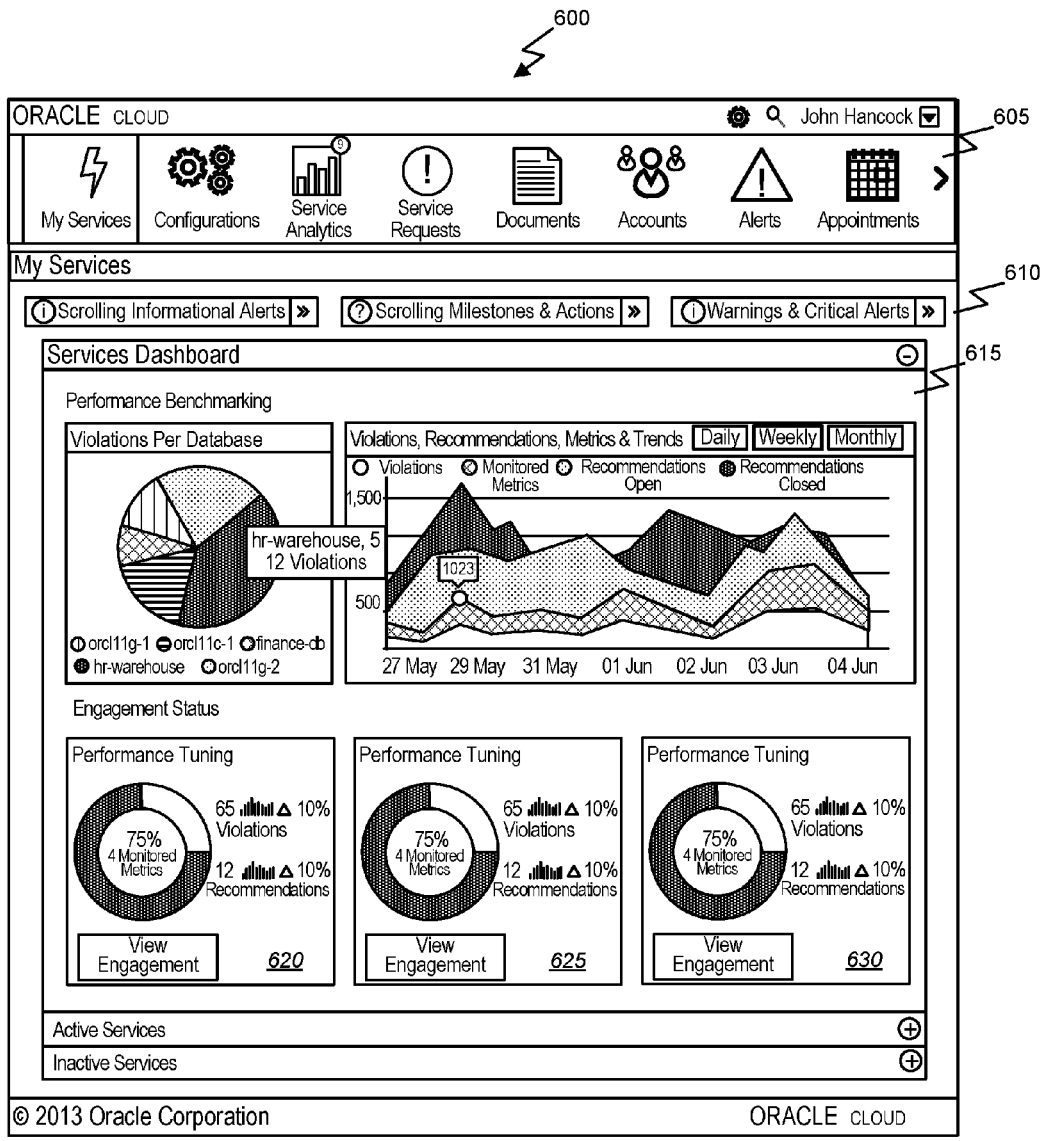
FIG. 6 illustrates an exemplary user interface including a performance tuning and benchmarking dashboard according to one embodiment of the present invention.

FIG. 6 illustrates an exemplary user interface including a performance tuning and benchmarking dashboard according to one embodiment of the present invention. This example shows a page 600 that can be presented as part of the portal user interface as described above. This page 600 includes a top level navigation header 605 and a content section 610. The options presented in the navigation header 605 provide the user with a number of options for navigation. The UI of the portal may give the customer access to the functionalities of the portal modules and layers. The navigation header 605 may include option for viewing services in "My Services", configurations in "Configurations", service analytics in "Service Analytics", service requests in "Service Requests", documents in "Documents", account information in "Accounts", alerts in "Alerts", and appointments and scheduled services in "Appointments." Selecting, clicking, touching, and/or the like any of the options of the navigation header 605 may invoke or initiate one or more layers, modules, and the like to provide the user with additional information pertaining to the option selected. In some embodiments, the information displayed in the content section 610 of the page 600 when an option of the navigation header 605 is selected may be generated in real time by the one or more layers and/or modules of the portal. In some embodiments, at least some of the information displayed when an option is selected in the navigation header 605 may be pre-generated by one or more of the layers and/or modules of the portal and stored for display when the option is selected.

In embodiments, selecting the "My Services" option from the navigation header 605 may provide in the content section 605 information related to services that are available or deployed to the gateway for the customer. For example, a service dashboard may be displayed that shows active services, inactive/complete services for example. The content section 610 may typically include a combination of data tables, graphs, text, pictures, maps, and/or the like to display or summarize the information. The content section 610 of the page 600 when the "My Services" option of the navigation header 605 is selected may display data related to specific services. For example and in the case of the performance tuning and benchmarking service described herein, the content section 610 can include a performance tuning dashboard representing key graphs for one or more performance tuning services. Each service engagement can be represented by a square region 620, 625, and 630 which the user can click to see more details.

Figure 7:
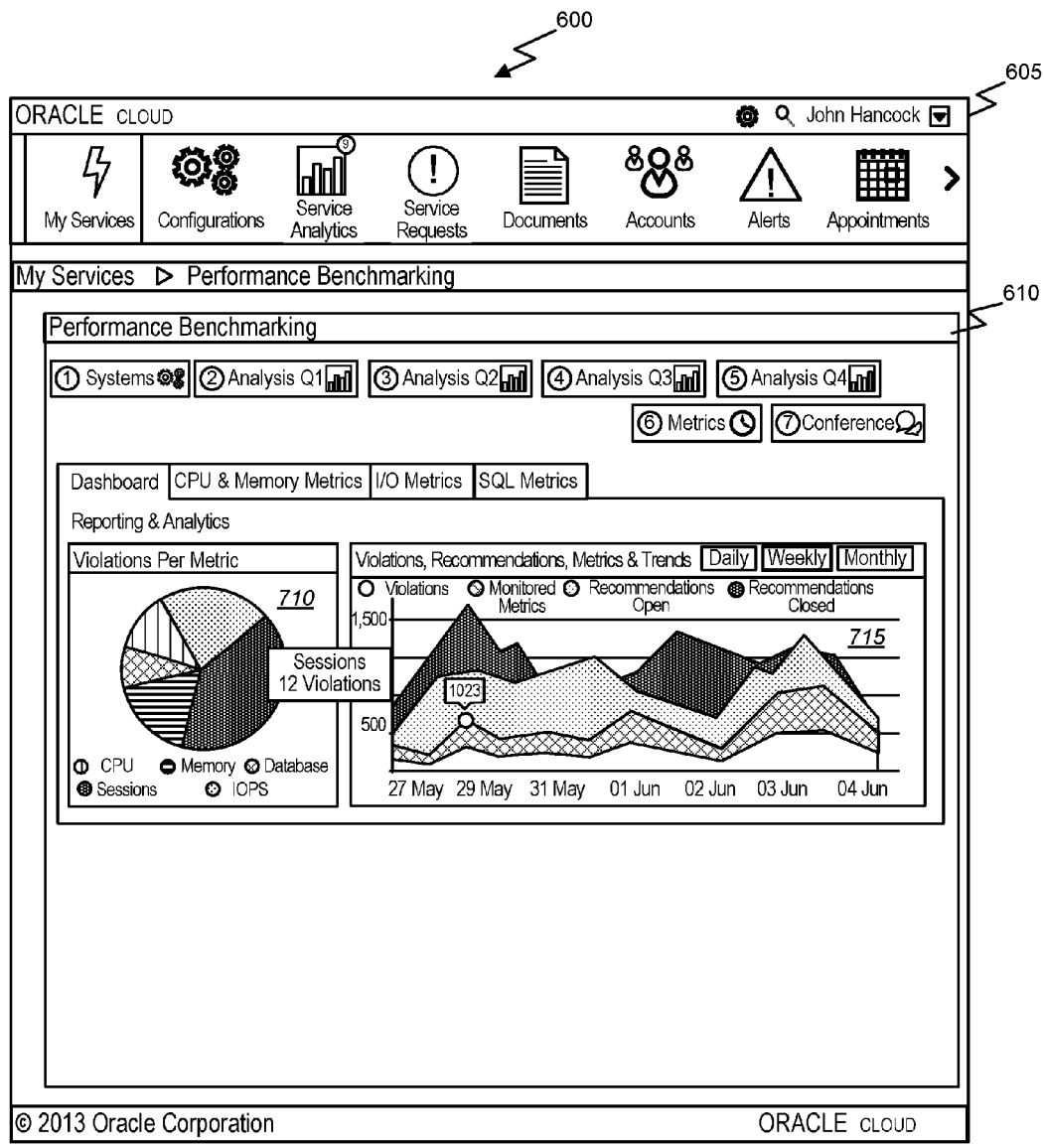
FIG. 7 illustrates additional details of an exemplary user interface including a performance tuning and benchmarking dashboard according to one embodiment of the present invention.

FIG. 7 illustrates additional details of an exemplary user interface including a performance tuning and benchmarking dashboard according to one embodiment of the present invention. In this example, the content section 610 of the page 600 has been updated, for example by the user clicking or selecting one of the service engagements. As a result, reports and analytics for the selected service engagement can be presented in the form of one or more graphs 710 and 715. This view allows the customer to see the various system indicators that are being monitored per system, and also the number of violations, i.e., how many broke the agreed monitoring thresholds. This dashboard can also allow the customer to see which systems are getting better over time.

Figure 8:
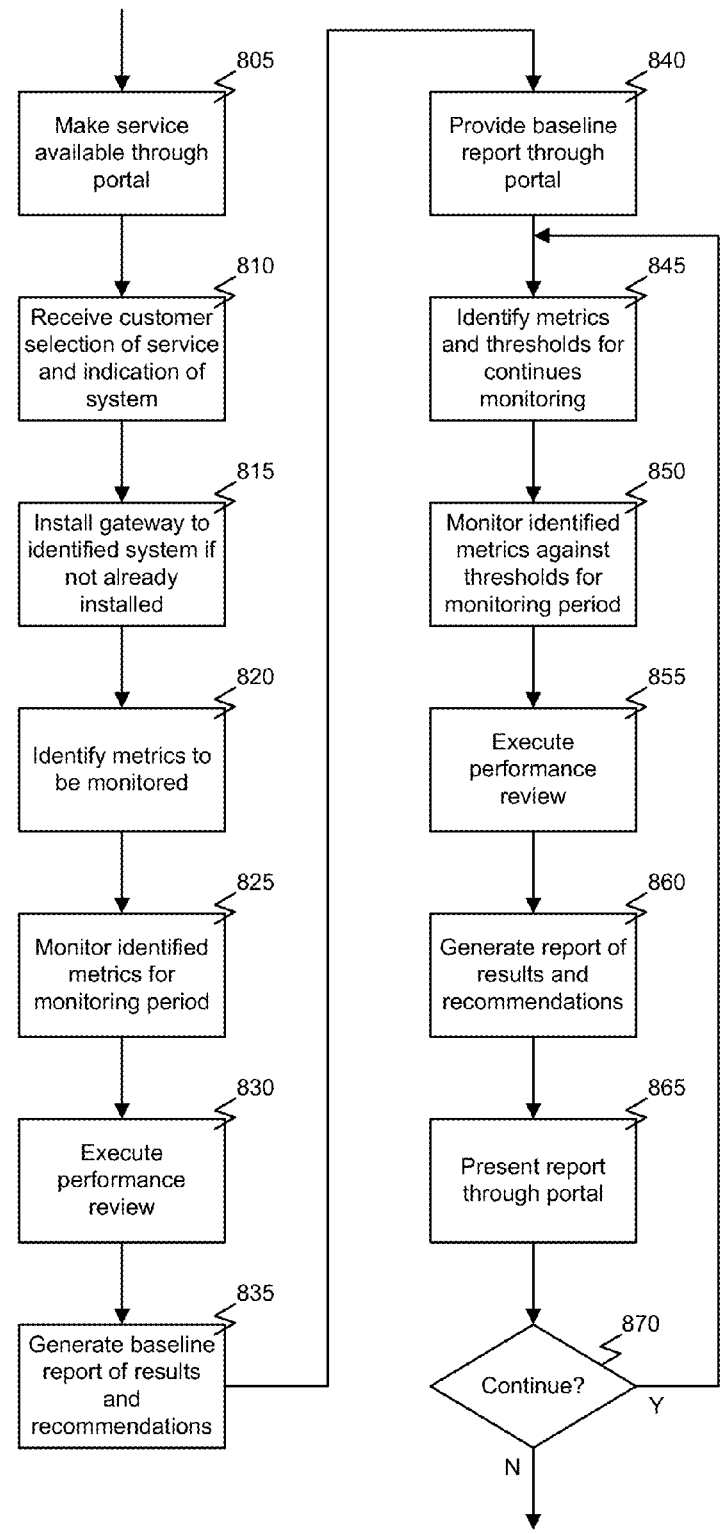
FIG. 8 is a flowchart illustrating additional details of a process for performing performance tuning and benchmarking according to one embodiment of the present invention.

FIG. 8 is a flowchart illustrating additional details of a process for performing performance tuning and benchmarking according to one embodiment of the present invention. As illustrated in this example, providing performance tuning and benchmarking services to one or more remote computer systems can comprise initiating by a service provider computer system one or more performance tuning and benchmarking services. More specifically, initiating the one or more load testing services can comprise providing 805 access to the one or more load testing services through the portal and receiving 810 through the portal a customer selection of at least one of the one or more services and an indication of the one or more remote computer system as targets of the selected at least one of the one or more services. Initiating the services may also include, in some cases, installing 815 the gateway on the one or more remote computer systems indicated as targets if the gateway is not yet installed on those one or more remote computer systems.

The service provider system can capture through the gateway data for a first set of metrics related to performance of the one or more remote computer systems for a first period of a defined term of the performance tuning and benchmarking services. Capturing the set of data related to performance of the one or more remote computers can comprise identifying 820 by the service provider system the first set of metrics related to performance of the one or more remote computer systems based at least in part on an indication received through the portal and monitoring 825 the identified first set of metrics for the first period.

A performance review can be performed 830 by the service provider computer system based on the captured data for the first set of metrics. Performing the performance review can also comprise generating 835 a baseline report for the first period. The baseline report can comprise results of the performance review and a set of recommendation associated with the results. This first set of one or more reports can be provided 840 by the service provider computer system through a portal. As noted above, adjustments can then be made to the customer system based on the recommendations provided in the reports.

The service provider system can then identify 845 a second set of metrics for continued monitoring and a threshold associated with each of the second set of metrics based at least in part on indications received through the portal. A second set of metrics related to performance of the one or more remote computer systems can be captured 850 by the service provider system through the gateway data for a second period of the defined term of the performance tuning and benchmarking services. Capturing data for the second set of metrics can include monitoring the captured data against the thresholds associated with the metrics.

Another performance review can be performed 855, e.g., at the end of the second period, by the service provider computer system based on the captured data for the second set of metrics. A second set of one or more reports based on results of performing the performance review on the captured data can be generated 860 and provided 865 by the service provider computer system through the portal. The report for the second period can comprise results of the performance review, indications of instances where the captured data exceeded the thresholds, and another set of recommendation associated with the results for the second period. Once again, adjustments can then be made to the customer system based on the recommendations provided in the reports.

A determination 870 can be made as to whether to continue the performance tuning and benchmarking service, i.e., whether the term of the services has expired. In response to determining 870 to continue, identifying metrics for continued monitoring, capturing data for the identified metrics, performing a performance review based on the captured data, and providing reports based on results of performing the performance review on the captured data can be repeated for a number of periods until an expiration of the term of the performance tuning and benchmarking services.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for providing performance tuning and benchmarking services to one or more remote computer systems, the method comprising:

initiating, by a service provider computer system, a gateway on one or more remote computer systems identified as targets, wherein the initiating is consequent to installing by the service provider computer system the gateway on the one or more remote computer systems if the gateway is determined to be not yet installed on the one or more remote computer systems;

initiating, by the service provider computer system, one or more performance tuning and benchmarking services;

capturing, by the service provider computer system through the gateway, data to identify captured data for a first set of metrics related to performance of the one or more remote computer systems operating with a real-life workload for a first period of a defined term of the performance tuning and benchmarking services;

performing, by the service provider computer system, a performance review based at least in part on the captured data for the first set of metrics, wherein performance issues are detected and ranked according to severities respectively attributed to the performance issues to result in at least a first detected performance issue assigned a first severity rank and a second detected performance issue assigned a second severity rank;

based at least in part on results of the performance review, deploying, by the service provider computer system from a library of different types of services, a first service of a first type to address the first detected performance issue; and providing, by the service provider computer system through a portal, a first set of one or more reports based at least in part on the results of the performing the performance review on the captured data, wherein the first set of one or more reports comprises a recommendation of a second service of a second type to address the second detected performance issue.

2. The method of claim 1, wherein the initiating the one or more performance tuning and benchmarking services comprises:

providing, by the service provider computer system, access to the one or more performance tuning and benchmarking services through the portal; and receiving, by the service provider computer system through the portal, a customer selection of at least one of the one or more performance tuning and benchmarking services and an indication of the one or more remote computer system as targets of the selected at least one of the one or more performance tuning and benchmarking services.

3. The method of claim 1, wherein the capturing the data related to performance of the one or more remote computer systems comprises:

identifying, by the service provider computer system, the first set of metrics to create an identified first set of metrics related to performance of the one or more remote computer systems based at least in part on an indication received through the portal; and monitoring the first set of metrics for the first period.

4. The method of claim 1, wherein the performing the performance review comprises generating a baseline report for the first period, the baseline report comprising results of the performance review and a set of recommendation associated with the results.

5. The method of claim 4, further comprising providing the baseline report through the portal.

6. The method of claim 1, further comprising:

identifying, by the service provider computer system and based at least in part on indications received through the portal, a second set of metrics for continued monitoring and a threshold associated with each of the second set of metrics;

capturing, by the service provider computer system through the gateway, second data to identify second captured data for a second set of metrics related to performance of the one or more remote computer systems for a second period of the defined term of the performance tuning and benchmarking services;

performing, by the service provider computer system, a performance review based at least in part on the second captured data for the second set of metrics; and providing, by the service provider computer system through the portal, a second set of one or more reports based at least in part on results of performing the performance review on the second captured data.

7. The method of claim 6, wherein the capturing the second data for the second set of metrics further comprises monitoring the second captured data against the thresholds associated with the second set of metrics.

8. The method of claim 7, further comprising generating a report for the second period, the report for the second period comprising results of the performance review, indications of instances where the second captured data exceeded the thresholds, and a set of recommendation associated with the results.

9. The method of claim 8, further comprising identifying metrics for continued monitoring to create identified metrics, capturing data to identify third captured data for the identified metrics, performing a performance review based at least in part on the third captured data, and providing reports based at least in part on results of the performing the performance review on the third captured data for a number of periods until an expiration of the defined term of the performance tuning and benchmarking services.

10. A system comprising:

a processor; and a memory coupled with and readable by the processor and storing a set of instructions which, when executed by the processor, causes the processor to provide performance tuning and benchmarking services to one or more remote computer systems by:

initiating a gateway on one or more remote computer systems identified as targets, wherein the initiating is consequent to installing the gateway on the one or more remote computer systems if the gateway is determined to be not yet installed on the one or more remote computer systems;

initiating one or more performance tuning and benchmarking services;

capturing, through a gateway, data to identify captured data for a first set of metrics related to performance of the one or more remote computer systems operating with a real-life workload for a first period of a defined term of the performance tuning and benchmarking services;

performing a performance review based at least in part on the captured data for the first set of metrics, wherein performance issues are detected and ranked according to severities respectively attributed to the performance issues to result in at least a first detected performance issue assigned a first severity rank and a second detected performance issue assigned a second severity rank;

based at least in part on results of the performance review, deploying, from a library of different types of services, a first service of a first type to address the first detected performance issue; and providing, through a portal, a first set of one or more reports based at least in part on the results of the performing the performance review on the captured data, wherein the first set of one or more reports comprises a recommendation of a second service of a second type to address the second detected performance issue.

11. The system of claim 10, wherein the initiating the one or more performance tuning and benchmarking services comprises:
    providing access to the one or more performance tuning and benchmarking services through the portal; and
    receiving, through the portal, a customer selection of at least one of the one or more performance tuning and benchmarking services and an indication of the one or more remote computer system as targets of the selected at least one of the one or more performance tuning and benchmarking services.

12. The system of claim 10, wherein the capturing the data related to performance of the one or more remote computer systems comprises:
    identifying the first set of metrics related to performance of the one or more remote computer systems based at least in part on an indication received through the portal; and
    monitoring the first set of metrics for the first period.

13. The system of claim 10, wherein the performing the performance review comprises generating a baseline report for the first period, the baseline report comprising results of the performance review and a set of recommendation associated with the results.

14. The system of claim 10, further comprising:
    identifying, based at least in part on indications received through the portal, a second set of metrics for continued monitoring and a threshold associated with each of the second set of metrics;
    capturing, through the gateway, second data to identify second captured data for a second set of metrics related to performance of the one or more remote computer systems for a second period of the defined term of the performance tuning and benchmarking services, wherein the capturing the second data for the second set of metrics further comprises monitoring the second captured data against the thresholds associated with the second set of metrics;
    performing a performance review based at least in part on the second captured data for the second set of metrics;
    generating a report for the second period based at least in part on results of performing the performance review on the captured data, the report for the second period comprising results of the performance review, indications of instances where the second captured data exceeded the thresholds, and a set of recommendation associated with the results; and
    providing, through the portal, the report for the second period.

15. The system of claim 14, further comprising identifying metrics for continued monitoring, capturing third data to identify third captured data for the identified metrics, performing a performance review based at least in part on the third captured data, and providing reports based at least in part on results of the performing the performance review on the third captured data for a number of periods until an expiration of the defined term of the performance tuning and benchmarking services.

16. A computer-readable memory comprising a set of instructions stored therein which, when executed by a processor, causes the processor to provide performance tuning and benchmarking services to one or more remote computer systems by:
    initiating a gateway on one or more remote computer systems identified as targets, wherein the initiating is consequent to installing the gateway on the one or more remote computer systems if the gateway is determined to be not yet installed on the one or more remote computer systems;
    initiating one or more performance tuning and benchmarking services;
    capturing, through a gateway, data to identify captured data for a first set of metrics related to performance of the one or more remote computer systems operating with a real-life workload for a first period of a defined term of the performance tuning and benchmarking services;
    performing a performance review based at least in part on the captured data for the first set of metrics, wherein performance issues are detected and ranked according to severities respectively attributed to the performance issues to result in at least a first detected performance issue assigned a first severity rank and a second detected performance issue assigned a second severity rank;
    based at least in part on results of the performance review, deploying, from a library of different types of services, a first service of a first type to address the first detected performance issue; and
    providing, through a portal, a first set of one or more reports based at least in part on the results of the performing the performance review on the captured data, wherein the first set of one or more reports comprises a recommendation of a second service of a second type to address the second detected performance issue.

17. The computer-readable memory of claim 16, wherein the initiating the one or more performance tuning and benchmarking services comprises:
    providing access to the one or more performance tuning and benchmarking services through the portal; and
    receiving, through the portal, a customer selection of at least one of the one or more performance tuning and benchmarking services and an indication of the one or more remote computer system as targets of the selected at least one of the one or more performance tuning and benchmarking services.

18. The computer-readable memory of claim 16, wherein the capturing the data related to performance of the one or more remote computer systems comprises:
    identifying the first set of metrics related to performance of the one or more remote computer systems based at least in part on an indication received through the portal; and
    monitoring the first set of metrics for the first period.

19. The computer-readable memory of claim 16, wherein the performing the performance review comprises generating a baseline report for the first period, the baseline report comprising results of the performance review and a set of recommendation associated with the results.

20. The computer-readable memory of claim 16, further comprising:
    identifying, based at least in part on indications received through the portal, a second set of metrics for continued monitoring and a threshold associated with each of the second set of metrics;
    capturing, through the gateway, second data to identify second captured data for the second set of metrics related to performance of the one or more remote computer systems for a second period of the defined term of the performance tuning and benchmarking services, wherein the capturing the second data for the second set of metrics further comprises monitoring the second captured data against the thresholds associated with the second set of metrics;

performing a performance review based at least in part on the second captured data for the second set of metrics;

generating a report for the second period based at least in part on results of performing the performance review on the second captured data, the report for the second period comprising results of the performance review, indications of instances where the second captured data exceeded the thresholds, and a set of recommendation associated with the results; and providing, through the portal, the report for the second period.

* * * * *

UNITED STATES PATENT AND TRADEMARK OFFICE
CERTIFICATE OF CORRECTION

PATENT NO. : 9,762,461 B2
APPLICATION NO. : 13/937483
DATED : September 12, 2017
INVENTOR(S) : Raghunathan et al.

Page 1 of 1

It is certified that error appears in the above-identified patent and that said Letters Patent is hereby corrected as shown below:

On the Title Page

On page 3, Column 2, under Other Publications, Line 42, delete "maiied" and insert -- mailed --, therefor.

Signed and Sealed this
Nineteenth Day of June, 2018

Andrei Iancu
*Director of the United States Patent and Trademark Office*